United States Patent
Garcia et al.

(10) Patent No.: US 11,067,281 B1
(45) Date of Patent: Jul. 20, 2021

(54) FUEL INJECTION ASSEMBLY FOR A TURBOMACHINE COMBUSTOR

(71) Applicant: General Electric Company, Schenectady, NY (US)

(72) Inventors: Marissa Singley Garcia, Greenville, SC (US); Robert Wade Clifford, Duncan, SC (US); Ronnie Ray Pentecost, Travelers Rest, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/032,405

(22) Filed: Sep. 25, 2020

(51) Int. Cl.
| | | |
|---|---|---|
| *F23R 3/34* | (2006.01) | |
| *F02C 7/228* | (2006.01) | |
| *F23R 3/10* | (2006.01) | |
| *F02C 7/18* | (2006.01) | |
| *F23R 3/28* | (2006.01) | |

(52) U.S. Cl.
CPC ............... *F23R 3/34* (2013.01); *F02C 7/18* (2013.01); *F02C 7/228* (2013.01); *F23R 3/10* (2013.01); *F23R 3/283* (2013.01)

(58) Field of Classification Search
CPC .. F23R 3/34; F23R 3/346; F23R 3/283; F23R 3/06; F23R 3/10
See application file for complete search history.

(56) References Cited

U.S. PATENT DOCUMENTS

| | | | |
|---|---|---|---|
| 6,755,024 B1* | 6/2004 | Mao | F23D 11/107 |
| | | | 239/416 |
| 9,010,120 B2* | 4/2015 | DiCintio | F23R 3/346 |
| | | | 60/746 |
| 9,303,872 B2* | 4/2016 | Hadley | F23R 3/346 |
| 10,415,831 B2* | 9/2019 | Hoffman | F23M 5/00 |
| 10,513,987 B2* | 12/2019 | Hughes | F23R 3/002 |
| 10,851,999 B2* | 12/2020 | Cai | F23R 3/286 |
| 2018/0112875 A1* | 4/2018 | Daniel | F23R 3/283 |
| 2018/0187893 A1* | 7/2018 | DiCintio | F23D 14/64 |
| 2019/0072279 A1 | 3/2019 | Natarajan et al. | |

* cited by examiner

*Primary Examiner* — Todd E Manahan
*Assistant Examiner* — Todd N Jordan
(74) *Attorney, Agent, or Firm* — Dority & Manning, P.A.

(57) ABSTRACT

A fuel injection assembly includes a fuel injector having end walls spaced apart from one another and side walls extending between the end walls. The end walls and the side walls collectively define a first opening for passage of air. At least one fuel injection member is disposed within the first opening and extends axially between the end walls. The fuel injector terminates at a radially inner surface. A boss that is fixedly connected to the combustion liner and extends radially through the cooling flow annulus to a flange portion positioned at the outer sleeve. The boss defines a second opening that provides for fluid communication between the fuel injector and the second combustion zone. The radially inner surface of the fuel injector is sealingly connected to the flange portion of the boss such that the first opening aligns with the second opening.

19 Claims, 6 Drawing Sheets

FUEL INJECTION ASSEMBLY FOR A TURBOMACHINE COMBUSTOR

FIELD

The present disclosure relates generally to fuel injectors for gas turbine combustors and, more particularly, to fuel injectors for use with an axial fuel staging (AFS) system associated with such combustors.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In some combustors, the generation of combustion gases occurs at two, axially spaced stages. Such combustors are referred to herein as including an "axial fuel staging" (AFS) system, which delivers fuel and an oxidant to one or more fuel injectors downstream of the head end of the combustor. In a combustor with an AFS system, a primary fuel nozzle at an upstream end of the combustor injects fuel and air (or a fuel/air mixture) in an axial direction into a primary combustion zone, and an AFS fuel injector located at a position downstream of the primary fuel nozzle injects fuel and air (or a second fuel/air mixture) as a cross-flow into a secondary combustion zone downstream of the primary combustion zone. The cross-flow is generally transverse to the flow of combustion products from the primary combustion zone.

In some cases, the fuel injectors in the AFS system includes an integrated tip that extends through a cooling flow annulus and into the secondary combustion zone of the combustor, in order to deliver a flow of fuel and air to the secondary combustion zone. However, issues exist with the use of fuel injectors having an integrated tip. For example, the tips of the injectors often become damaged during operation of the combustor due to oxidation that occurs from hot gas ingestion and recirculation within the tip. Because the integrated tip injectors are often made as a single piece construction, oxidation damage at the tip can result in having to scrap and replace the entire fuel injector, which can be costly due to the relatively expensive material used to make the fuel injector.

As such, a fuel injection assembly capable of delivering fuel and air to a secondary combustion zone, without being damaged by oxidation overtime, is desired in art.

BRIEF DESCRIPTION

Aspects and advantages of the combustors and turbomachines in accordance with the present disclosure will be set forth in part in the following description, or may be obvious from the description, or may be learned through practice of the technology.

In accordance with one embodiment, a combustor is provided. The combustor includes an end cover. The combustor further includes at least one fuel nozzle that extends between the end cover and a combustion liner. The combustion liner extends between the at least one fuel nozzle and an aft frame. An outer sleeve is spaced apart from and surrounds the combustion liner such that a cooling flow annulus is defined therebetween. The combustion liner defines a combustion chamber having first combustion zone downstream from the at least one fuel nozzle and a second combustion zone downstream from the first combustion zone. The combustor further includes a fuel injection assembly disposed downstream from the at least one fuel nozzle. The fuel injection assembly includes a fuel injector having end walls spaced apart from one another and side walls extending between the end walls. The end walls and the side walls collectively define a first opening for passage of air. At least one fuel injection member is disposed within the first opening and extends axially between the end walls. The fuel injector terminates at a radially inner surface. The fuel injection assembly further includes a boss that is fixedly connected to the combustion liner and extends radially through the cooling flow annulus to a flange portion positioned at the outer sleeve. The boss defines a second opening that provides for fluid communication between the fuel injector and the second combustion zone. The radially inner surface of the fuel injector is sealingly connected to the flange portion of the boss such that the first opening aligns with the second opening.

In accordance with another embodiment, a turbomachine is provided. The turbomachine includes a compressor section, a turbine section, a combustor disposed downstream from the compressor section and upstream from the turbine section. The combustor includes an end cover. The combustor further includes at least one fuel nozzle that extends between the end cover and a combustion liner. The combustion liner extends between the at least one fuel nozzle and an aft frame. An outer sleeve is spaced apart from and surrounds the combustion liner such that a cooling flow annulus is defined therebetween. The combustion liner defines a combustion chamber having first combustion zone downstream from the at least one fuel nozzle and a second combustion zone downstream from the first combustion zone. The combustor further includes a fuel injection assembly disposed downstream from the at least one fuel nozzle. The fuel injection assembly includes a fuel injector having end walls spaced apart from one another and side walls extending between the end walls. The end walls and the side walls collectively define a first opening for passage of air. At least one fuel injection member is disposed within the first opening and extends axially between the end walls. The fuel injector terminates at a radially inner surface. The fuel injection assembly further includes a boss that is fixedly connected to the combustion liner and extends radially through the cooling flow annulus to a flange portion positioned at the outer sleeve. The boss defines a second opening that provides for fluid communication between the fuel injector and the second combustion zone. The radially inner surface of the fuel injector is sealingly connected to the flange portion of the boss such that the first opening aligns with the second opening.

In accordance with yet another embodiment, a fuel injection assembly is provided. The fuel injection assembly includes a fuel injector having end walls spaced apart from one another and side walls extending between the end walls. The end walls and the side walls collectively define a first opening for passage of air. At least one fuel injection member is disposed within the first opening and extends axially between the end walls. The fuel injector terminates at a radially inner surface. The fuel injection assembly further includes a boss that defines a second opening that provides for fluid communication between the fuel injector and a combustion zone. The radially inner surface of the fuel injector is sealingly connected to a flange portion of the boss such that the first opening aligns with the second opening.

These and other features, aspects and advantages of the present combustors and turbomachines will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustors and turbomachines, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present combustors and turbomachines, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component. terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
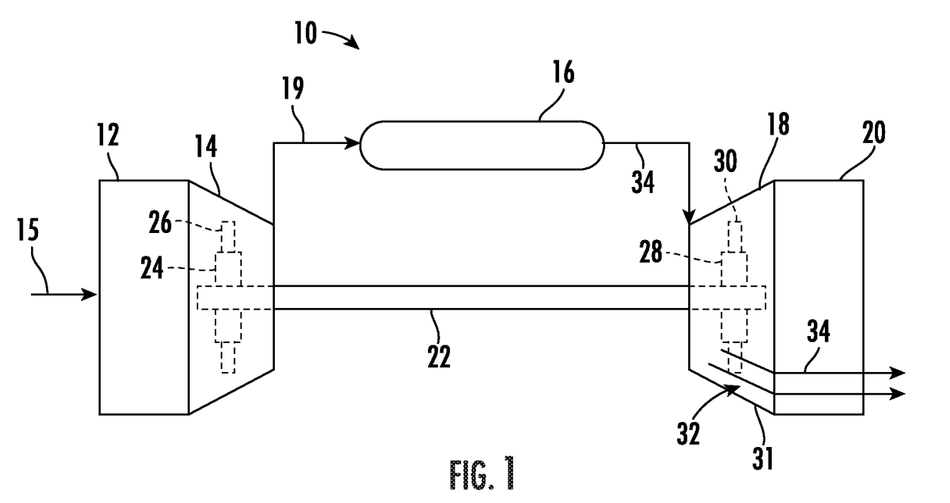
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land based and/or industrial gas turbine unless otherwise specified in the claims. For example, the invention as described herein may be used in any type of turbomachine including but not limited to a steam turbine, an aircraft gas turbine, or a marine gas turbine.

As shown, gas turbine 10 generally includes an inlet section 12, a compressor section 14 disposed downstream of the inlet section 12, a plurality of combustors 17 (FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air 15 flows through the inlet section 12 and into the compressor section 14 where the air 15 is progressively compressed, thus providing pressurized air or compressed air 19 to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
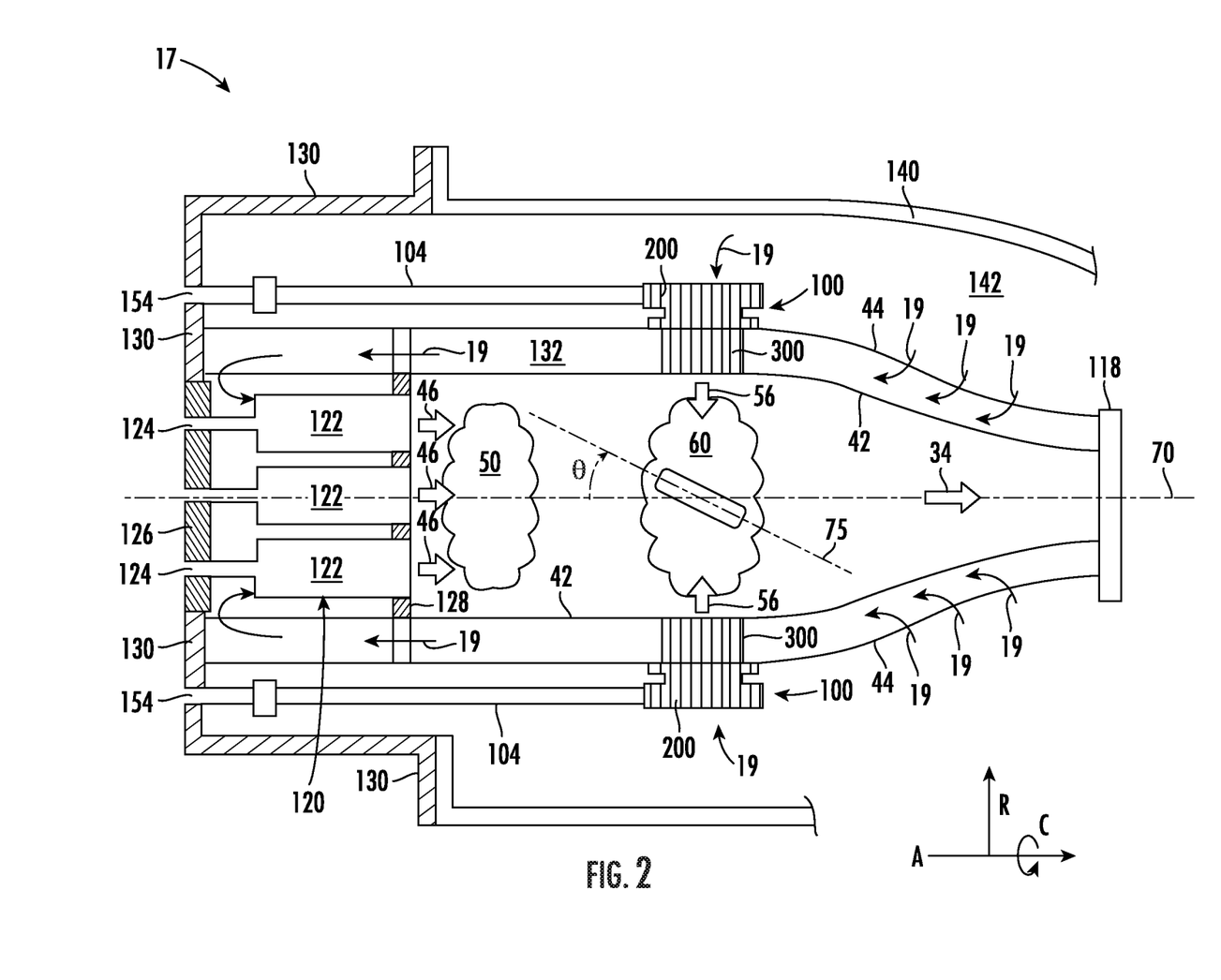
FIG. 2 is a schematic illustration of a cross-sectional side view of a combustor in accordance with embodiments of the present disclosure.

FIG. 2 is a schematic representation of a combustor 17, as may be included in a can annular combustion system for a heavy-duty gas turbine. In a can-annular combustion system, a plurality of combustors 24 (e.g., 8, 10, 12, 14, 16, or more) are positioned in an annular array about a rotor that connects a compressor to a turbine. The turbine may be operably connected (e.g., by the rotor) to a generator for producing electrical power.

As shown in FIG. 2, the combustor 17 may define an axial direction A and a circumferential direction C which extends around the axial direction A. The combustor 17 may also define a radial direction R perpendicular to the axial direction A.

In FIG. 2, the combustor 24 includes a combustion liner 42 that contains and conveys combustion gases 34 to the turbine. The combustion liner 42 may have a cylindrical liner portion and a tapered transition portion that is separate from the cylindrical liner portion, as in many conventional combustion systems. Alternately, the combustion liner 42 may have a unified body (or "unibody") construction, in which the cylindrical portion and the tapered portion are integrated with one another. Thus, any discussion of the combustion liner 42 herein is intended to encompass both conventional combustion systems having a separate liner and transition piece and those combustion systems having a unibody liner. Moreover, the present disclosure is equally applicable to those combustion systems in which the transition piece and the stage one nozzle of the turbine are integrated into a single unit, sometimes referred to as a "transition nozzle" or an "integrated exit piece."

The combustion liner 42 is surrounded by an outer sleeve 44, which is spaced radially outward of the combustion liner 42 to define a cooling flow annulus 132 between the combustion liner 42 and the outer sleeve 44. The outer sleeve 44 may include a flow sleeve portion at the forward end and an impingement sleeve portion at the aft end, as in many conventional combustion systems. Alternately, the outer sleeve 44 may have a unified body (or "unisleeve") construction, in which the flow sleeve portion and the impingement sleeve portion are integrated with one another in the axial direction. As before, any discussion of the outer sleeve 44 herein is intended to encompass both convention combustion systems having a separate flow sleeve and impingement sleeve and combustion systems having a unisleeve outer sleeve.

A head end portion 120 of the combustor 17 includes one or more fuel nozzles 122. The fuel nozzles 122 have a fuel inlet 124 at an upstream (or inlet) end. The fuel inlets 124 may be formed through an end cover 126 at a forward end of the combustor 17. The downstream (or outlet) ends of the fuel nozzles 122 extend through a combustor cap 128.

The head end portion 120 of the combustor 17 is at least partially surrounded by a forward casing 130, which is physically coupled and fluidly connected to a compressor discharge case 140. The compressor discharge case 140 is fluidly connected to an outlet of the compressor 16 (shown in FIG. 1) and defines a pressurized air plenum 142 that surrounds at least a portion of the combustor 17. Compressed air 19 flows from the compressor discharge case 140 into the cooling flow annulus 132 through holes in the outer sleeve 44 near an aft end 118 of the combustor 17. Because the cooling flow annulus 132 is fluidly coupled to the head end portion 120, the compressed air 19 travels upstream from near the aft end 118 of the combustor 17 to the head end portion 120, where the compressed air 19 reverses direction and enters the fuel nozzles 122.

The fuel nozzles 122 introduce fuel and air, as a primary fuel/air mixture 46, into a primary combustion zone 50 at a forward end of the combustion liner 42, where the fuel and air are combusted. In one embodiment, the fuel and air are mixed within the fuel nozzles 122 (e.g., in a premixed fuel nozzle). In other embodiments, the fuel and air may be separately introduced into the primary combustion zone 50 and mixed within the primary combustion zone 50 (e.g., as may occur with a diffusion nozzle). Reference made herein to a "first fuel/air mixture" should be interpreted as describing both a premixed fuel/air mixture and a diffusion-type fuel/air mixture, either of which may be produced by fuel nozzles 122.

The combustion gases from the primary combustion zone 50 travel downstream toward an aft end 118 of the combustor 17. One or more fuel injectors 100 introduce fuel and air, as a secondary fuel/air mixture 56, into a secondary combustion zone 60, where the fuel and air are ignited by the primary zone combustion gases to form a combined combustion gas product stream 34. Such a combustion system having axially separated combustion zones is described as an "axial fuel staging" (AFS) system, and the injector assemblies 100 may be referred to herein as "AFS injectors."

In the embodiment shown, fuel for each injector assembly 100 is supplied from the head end of the combustor 17, via a fuel inlet 154. Each fuel inlet 154 is coupled to a fuel supply line 104, which is coupled to a respective injector assembly 100. It should be understood that other methods of delivering fuel to the injector assemblies 100 may be employed, including supplying fuel from a ring manifold or from radially oriented fuel supply lines that extend through the compressor discharge case 140.

FIG. 2 further shows that the injector assemblies 100 may be oriented at an angle θ (theta) relative to the longitudinal center line 70 of the combustor 17. In the embodiment shown, the leading edge portion of the injector 100 (that is, the portion of the injector 100 located most closely to the head end) is oriented away from the center line 70 of the combustor 17, while the trailing edge portion of the injector 100 is oriented toward the center line 70 of the combustor 10. The angle θ, defined between the longitudinal axis 75 of the injector 100 and the center line 70, may be between 0 degrees and ±45 degrees, between 0 degrees and ±30 degrees, between 0 degrees and ±20 degrees, or between 0 degrees and ±10 degrees, or any intermediate value therebetween.

FIG. 2 illustrates the orientation of the injector assembly 100 at a positive angle relative to the center line 70 of the combustor. In other embodiments (not separately illustrated), it may be desirable to orient the injector 100 at a negative angle relative to the center line 70, such that the leading edge portion is proximate the center line 70, and the trailing edge portion is distal to the center line 70. In one embodiment, all the injector assemblies 100 for a combustor 17, if disposed at a non-zero angle, are oriented at the same angle (that is, all are oriented at the same positive angle, or all are oriented at the same negative angle).

The injector assemblies 100 inject the second fuel/air mixture 56 into the combustion liner 42 in a direction transverse to the center line 70 and/or the flow of combustion products from the primary combustion zone, thereby forming the secondary combustion zone 60. The combined combustion gases 34 from the primary and secondary combustion zones travel downstream through the aft end 118 of the combustor can 24 and into the turbine section 28 (FIG. 1), where the combustion gases 34 are expanded to drive the turbine 28.

Notably, to enhance the operating efficiency of the gas turbine 10 and to reduce emissions, it is desirable for the injector 100 to thoroughly mix fuel and compressed gas to form the second fuel/air mixture 56. Thus, the injector embodiments described below facilitate improved mixing. Additionally, because the fuel injectors 100 include a large number of fuel injection ports, as described further below, the ability to introduce fuels having a wide range of heat release values is increased, providing greater fuel flexibility for the gas turbine operator.

Figure 3:
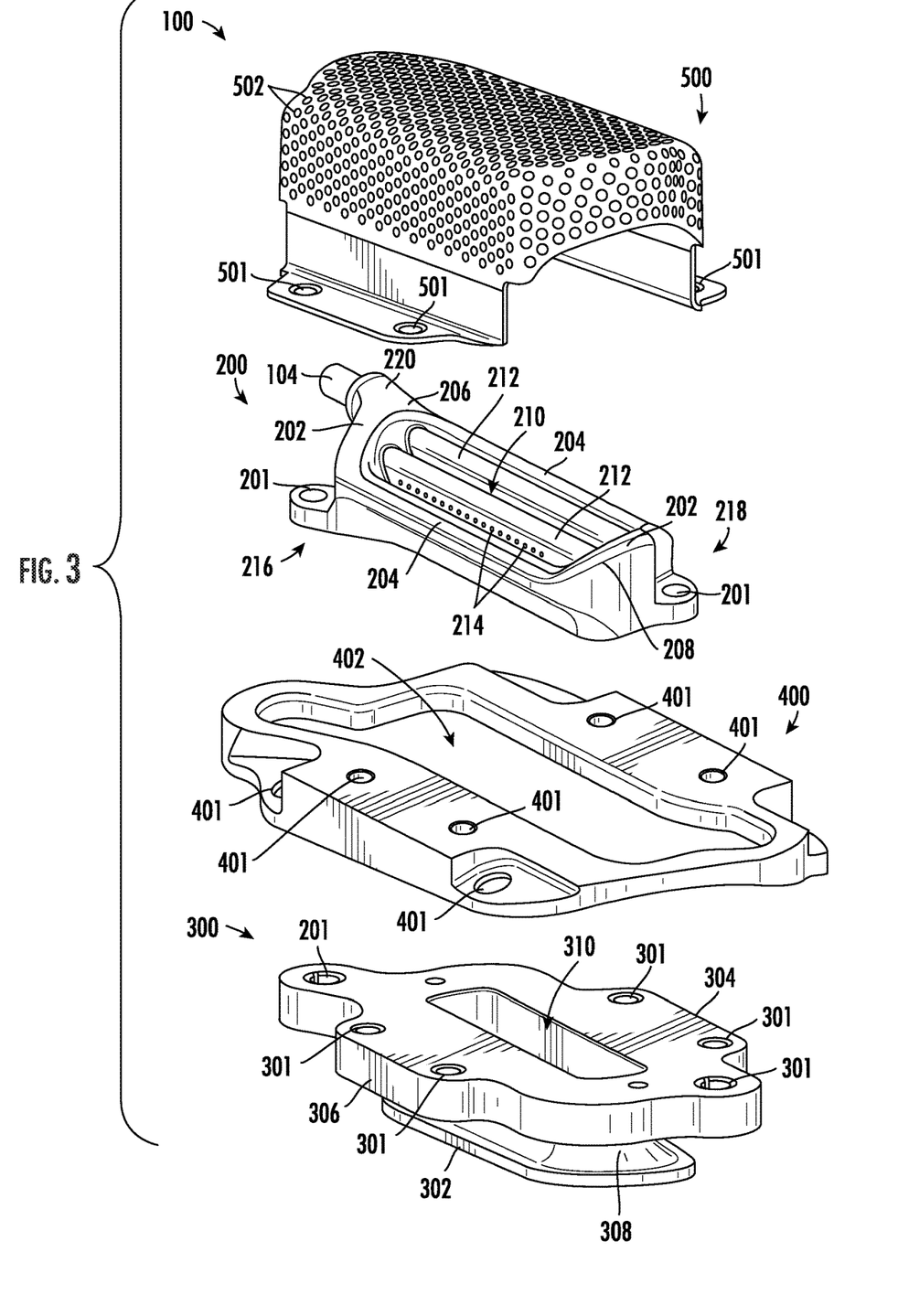
FIG. 3 is a perspective view of a fuel injection assembly, in which components are exploded away from one another, in accordance with embodiments of the present disclosure.

FIG. 3 illustrates an exemplary fuel injection assembly 100 in accordance with embodiments of the present disclosure, in which the components of the fuel injection assembly 100 are exploded away from one another. As shown, the injector assembly 100 may include a fuel injector 200.

The fuel injector 200 includes end walls 202 spaced apart from one another and side walls 204 extending between the end walls 202. In exemplary embodiments, the side walls extend axially between the end walls 202 along the axial direction A. The end walls 202 of the fuel injector 200 include a forward end wall 206 and an aft end wall 208 disposed oppositely from one another. The side walls 204 may be spaced apart from one another and may extend axially between the forward end wall 206 and the aft end wall 208. In many embodiments, both the forward end wall 206 and the aft end wall 208 are be generally arcuate and have a semi-circular cross-sectional shape, such that the end walls 202 and the side walls 204 collectively define a first opening 210. In some embodiments, as shown, the end walls 202 and the side walls 204 may collectively define a geometric stadium shaped area, i.e. a rectangle having rounded ends, that outlines and defines a perimeter of the first opening 210. In other embodiments (not shown), the end walls 202 may be straight such that the end walls 202 and the side walls 204 collectively define a rectangular shaped area.

In many embodiments, the first opening 210 may function to provide a path for compressed air 19 from the pressurized air plenum 142 to travel through and be mixed with fuel introduced by the fuel injector 200. As shown in FIG. 3, the fuel injector 200 may further include at least one fuel injection member 212, which may be disposed within the first opening 210 and extend axially between the end walls 202. The fuel injection members 212 may be substantially hollow bodies that function to provide fuel to the first opening 210 via a plurality of fuel ports 214 defined through the fuel injection members 212. Each of the fuel injection members may extend from a first end 216 located at the forward end wall 206 to a second end 218 positioned at the aft end wall 208. In many embodiments, the fuel injection members 212 may be spaced apart from one another within the opening 210 may extend straight, i.e., without a sudden change in direction, from the forward end wall 206 to the aft end wall 208 in the axial direction A. In the embodiment shown in FIG. 3, the fuel injector is shown as having two fuel injection members 212. However, the fuel injector 200 may have any number of fuel injection members 212 disposed within the first opening 210 (e.g. 1, 3, 4, 5, 6, or more), and the present invention is not limited to any particular number of fuel injection members 212 unless specifically recited in the claims.

As shown in FIG. 3, the fuel injector 200 further includes a conduit fitting 220 that is integrally formed with the forward end wall. The conduit fitting 220 may be fluidly coupled to the fuel supply line such that it functions to receive a flow of fuel from the fuel supply line 104. The conduit fitting 220 may then distribute fuel to each of the fuel injection members 212 and/or the side wall fuel injection members 222, 224 (FIG. 4) to be ejected into the first opening 210 and mixed with the compressed air 19. The conduit fitting 332 may have any suitable size and shape, and may be formed integrally with, or coupled to, any suitable portion(s) of the fuel injector 200 that enables the conduit fitting 332 to function as described herein.

In many embodiments, the entire fuel injector 200 may be integrally formed as a single component. That is each of the subcomponents, e.g., the end walls 202, the side walls 204, the fuel injection members, and any other subcomponent of the fuel injector, may be manufactured together as a single body. In exemplary embodiments, this may be done by utilizing an additive manufacturing method such as 3D printing. However, in other embodiments, other manufacturing techniques, such as casting or other suitable techniques, may be used. In this regard, utilizing additive manufacturing methods, the fuel injector 200 may be integrally formed as a single piece of continuous metal, and may thus include fewer sub-components and/or joints compared to prior designs. The integral formation of the fuel injector 200 through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Figure 4:
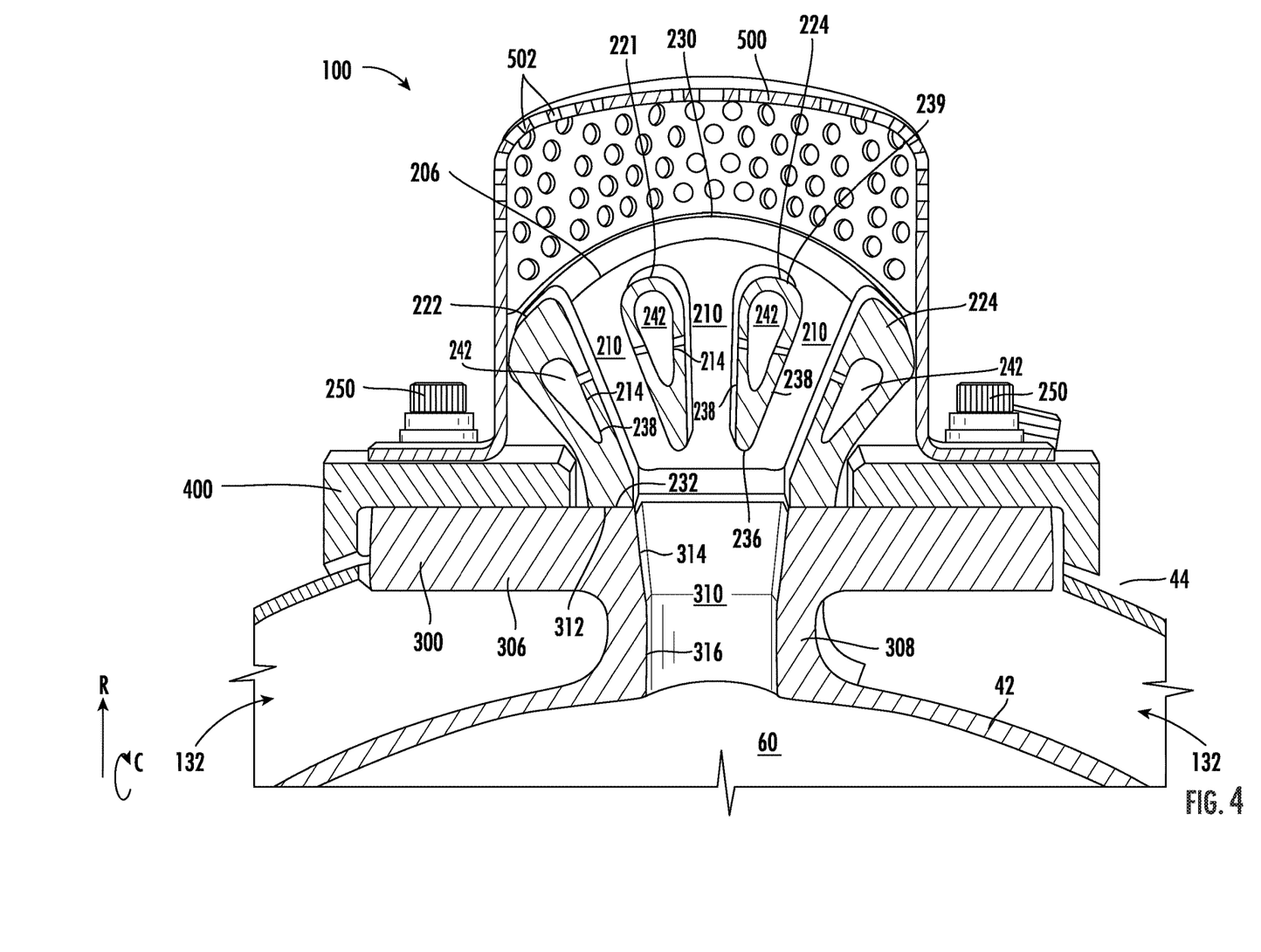
FIG. 4 illustrates a cross-sectional side view of a fuel injection assembly in accordance with embodiments of the present disclosure.
Figure 5:
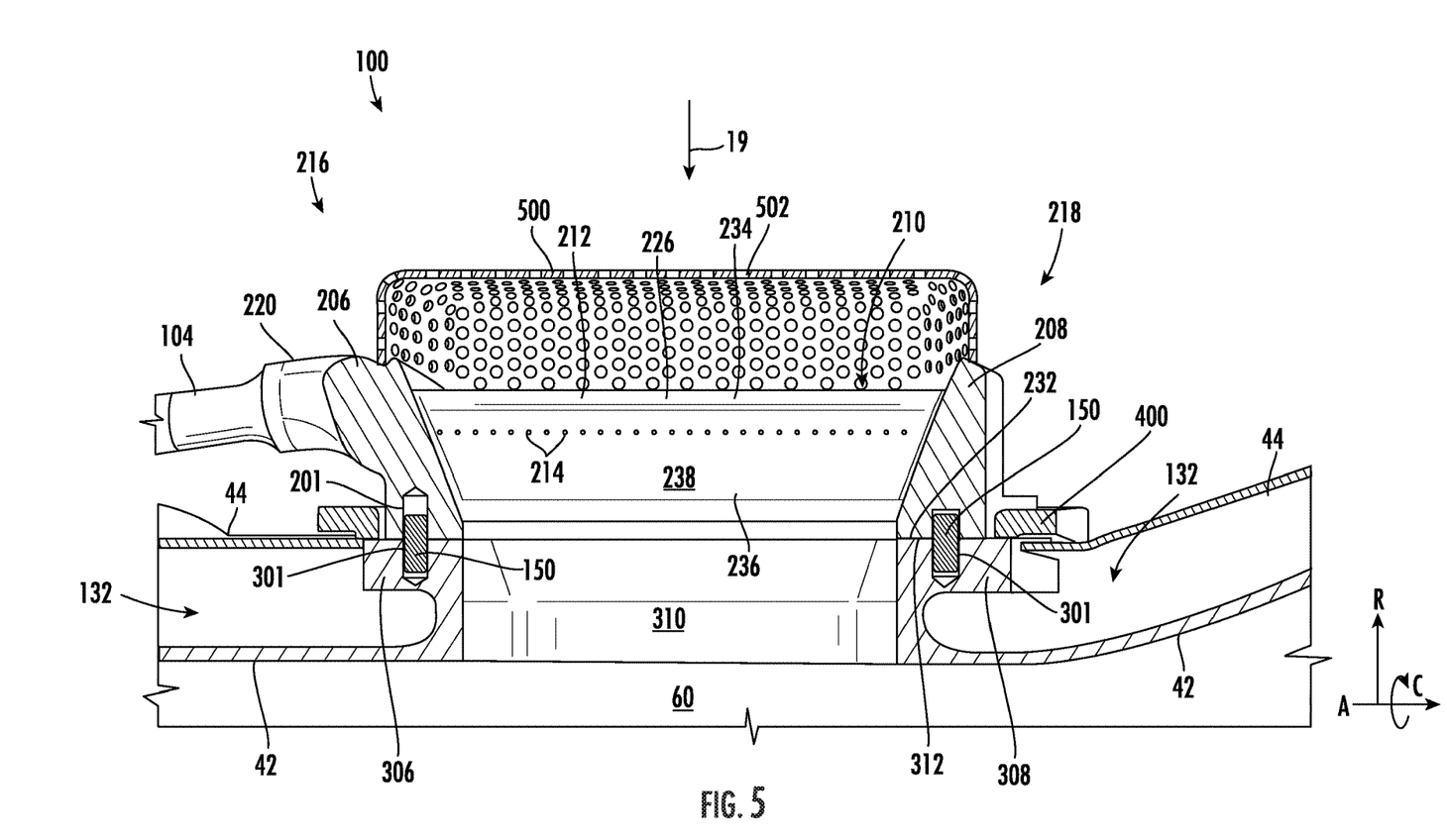
FIG. 5 illustrates a cross-sectional side view of a fuel injection assembly in accordance with embodiments of the present disclosure.

As shown in FIG. 3, the fuel, injector assembly 100 may further include a boss 300, support plate 400, and an inlet flow conditioner 500. As shown in FIGS. 4 and 5, the boss 300 may be fixedly coupled to the combustion liner 42 at a first end 302 and may extend radially through the cooling flow annulus 132 to a flange portion 306 disposed at a second end 304. The flange portion 306 may include a radially outer surface 312 that is substantially flat and/or planar. In many embodiments, the boss 300 may include a jacket portion 308 that extends between the first end 302 and the flange portion 306.

The boss 300 may define a second opening 310 that aligns with the first opening and creates a path for fuel and air to be introduced into secondary combustion zone 60. For example, in some embodiments, the second opening 310 and the first opening may share a common center axis 350 (FIGS. 4 and 5). In this way, the boss 300 provides for fluid communication between the secondary combustion zone 60 and the fuel injector 200. More specifically, the second opening 310 may be defined by flange portion 306 and the jacket portion 308 of the boss 300 and may be shaped as a geometric stadium, i.e. a rectangle having rounded ends. In many embodiments, the size of the second opening 310 may vary between fuel injection assemblies 100 on the combustor 17. For example, because the second opening 310 functions at least partially to meter the flow of air and fuel being introduced to the secondary combustion zone 60, it may be advantageous in some embodiments to have more/less air and fuel be introduced through each one of the fuel injection assembly 100 on the combustor 17. This may be accomplished by having increasing or decreasing the size of the second opening 310 depending on how much air and fuel is desired to be introduced to the secondary combustion zone 60.

As shown in FIGS. 4 and 5, The jacket portion 308 extends from the flange 306, through the cooling flow annulus 132, to the combustion liner 42. In many embodiments, the jacket portion 308 creates impediment to the flow of compressed air 19 through the cooling flow annulus 132 (FIG. 4). However, as shown in FIG. 3, the jacket portion 306 is shaped as a geometric stadium having its major axis parallel to the direction of the compressed air 19 flow. This advantageously produces a smaller compressed air 19 blockage in the cooling flow annulus 132 than, for example, a jacket portion having a round shape, while still providing an adequate area for enough fuel and air to be introduced through the second opening 310 and into the secondary combustion zone 60.

In many embodiments, as shown in FIGS. 3-5 collectively, the inlet flow conditioner 500 may surround the fuel injector 200. The inlet flow conditioner may include a plurality of holes 502 defined therethrough that allow for fluid communication between the pressurized air plenum 142 and the fuel nozzle 200. For example, the inlet flow conditioner 500 may function to reduce the non-uniformity of the compressed air 19 from the pressurized air plenum 142 before it enters the first opening 210 of the fuel nozzle 200 to ensure the compressed air 19 is properly mixed with the fuel introduced by the fuel injection members 212.

In exemplary embodiments, as shown in at least FIGS. 3-5, the fuel injector 200 does not couple directly to the support plate 400 or the inlet flow conditioner 500. Rather, as shown, the support plate 400 includes a cut-out portion 402 that surrounds the perimeter of the fuel injector 200, such that the fuel injector 200 and the support plate 400 may each be separately coupled to the boss 300. Further, the inlet flow conditioner 500 may be coupled directly to the support plate 400 such that it surrounds the fuel injector 200 but does not couple directly to the fuel injector 200.

As shown, the fuel injector 200, the boss 300, the support plate 400, and the inlet flow conditioner 500 may each include fastener holes 201, 301, 401, and 501 that are each sized to receive a mechanical fastener 250 (FIGS. 4 and 5), such as but not limited to pins, bolts, or the like, in order to be fixedly connected to various other fuel injection assembly 100 components. In many embodiments, the fastener holes 201, 301, 401, and 501 may be threaded or otherwise formed to receive a respective mechanical fastener 250. For example, the fastener holes 201 of the fuel injector 200 align may align with the fastener holes 301 of the boss 300 to be coupled thereto via a mechanical fastener 250. Similarly, the fastener holes 401 of the support plate 400 may align with both the fastener holes 501 of the inlet flow conditioner and the fastener holes 301 of the boss 300 in order to couple the support plate 400 to both the boss 300 and the inlet flow conditioner 500.

In many embodiments, both the boss 300 and/or the support plate may be entirely separate components from the fuel injector 200 and may be separately manufactured from the fuel injector 200. As discussed above, in many embodiments, the fuel injector 200 is additively manufactured using a relatively expensive printed metal material. Therefore, having the support plate 400 and the boss 300 be separate components from the fuel injector allows for material cost savings. Further, separately manufacturing the support plate 400 and the boss 300 from the fuel injector 200 instead of, e.g., having them be integrally formed, allows for the fuel injector 200 to be produced much quicker thereby allowing for manufacturing cost savings.

In various embodiments, as shown, the fuel injector 200 and the boss 300 may be entirely separate components, which advantageously allows for the components to be manufactured using separate processes. For example, due to the boss' 300 relatively simple geometry (when compared to the fuel injector 200), it may be manufactured using a more cost effective process, such as casting or other suitable processes. In many embodiments, the fuel injector 200 may be formed from a first material and the boss 300 may be formed a second material. In some embodiments, the second material of the boss 300 may different than the first material of the fuel injector 200. For example, the first material and the second material may be selected from a list of materials including but not limited to pure metals, ceramics, nickel alloys, chrome alloys, titanium, titanium alloys, magnesium, magnesium alloys, aluminum, aluminum alloys, iron, iron alloys, stainless steel, and nickel or cobalt based superalloys (e.g., those available under the name Inconel® available from Special Metals Corporation). Utilizing separate components for the fuel injector 200 and the boss 300 advantageously allows for decreased risk of having to scrap the entire fuel injection assembly 100 when a single component is damaged, which results in cost savings. For example, damaged caused by recirculation of combustion gases within the boss 300 may result in replacement of only the boss 300, which, as discussed above, is a relatively inexpensive part.

In exemplary embodiments, the fuel injector 200 and the boss 300 being separate components may advantageously allow for compressor cooling air savings. For example, in many embodiments, the boss 300 be a solid (or impermeable) component, such that no air or other fluids may pass therethrough. For example, the boss 300 may be solid such that there are no cooling holes, channels, and/or cavities defined therein. This may be advantageous over prior designs, which include a unitary fuel injector having cooling channels defined therein in order to direct cooling air from the compressor towards the integrated tip of the unitary fuel injector. The boss 300 being solid provides decreased cooling air utilization from the compressor section. This improves the overall operating efficiency of the turbomachine because the amount of working fluid that may be used in the turbine section may be favorably increased.

FIGS. 4 and 5 illustrate two different cross-sectional views of the fuel injection assembly 100 coupled to the combustor 17. As shown in FIG. 4, the side walls 204 may include a first side wall fuel injection member 222 and a second side wall fuel injection member 224. In various embodiments, as shown, the fuel injection members 212 may be a third fuel injection member 226 and a fourth fuel injection member 228. In many embodiments, the first side wall fuel injection member 222 and the second side wall fuel injection member 224 may converge towards one another as they extend radially inward. Similarly, as shown in FIG. 5, the forward end wall 206 and the aft end wall 208 may converge towards one another as they extend radially inward. In this way, the entire geometric stadium area defined by the end walls 202 and the side walls 204 gradually reduces from a radially outer surface 230 to a radially inner surface 232 of the fuel injector 200.

As shown in FIG. 4, the side wall fuel injection members 222, 224 and the fuel injection members 226, 228 may each have a cross-sectional profile defining a teardrop shape. As shown, the teardrop is characterized as having a leading edge 234, a trailing edge 236 opposite the leading edge 234, and oppositely disposed outer surfaces 238. Both the outer surfaces 238 may extend between the leading edge 234 and the trailing edge 236. In various embodiments, the exterior cross-sectional profile of the fuel injection members 226, 228 may be uniform in the axial direction A, such that there is no sudden change in shape or orientation as they extend in the axial direction A from the forward end wall 206 to the aft end wall 208. In many embodiments, the outer surface of each fuel injection member 222, 224, 226, 228 defines the plurality of fuel injection ports 214. In at least one embodiment, the fuel injection ports may be disposed in a single row. In many embodiments, there may be six injection planes within the fuel injector 200. For example, a single row of fuel ports 214 may be defined on both the side wall fuel injection members 222, 224, which provides for two of the fuel injection planes. Four more fuel injection planes may be disposed on the fuel injection members 226, 228. For example, each fuel injection member 226, 228 may have a single row of fuel ports 214 disposed on either side of the fuel injection members 226, 228, which provides four fuel injection planes.

Each of the fuel injection members 222, 224, 226, 228 may include a fuel plenum 242 defined therein in fluid communication with the fluid conduit 104, such that the fuel injection members 222, 224, 226, 228 receive a flow fuel within the fuel plenum 242 and inject the fuel within the first opening 210 via the fuel injection ports 214. Although the side wall fuel injection members 222, 224 and the fuel injection members 226, 228 are shown in FIG. 4 as having a teardrop shaped cross section, the side wall fuel injection members 222, 224 and the fuel injection members 226, 228 may each have a cross-sectional profile defining any one of a circular shape, triangular shape, diamond shape, rectangular shape, or any other suitable cross sectional shape.

As shown in FIG. 4, the fuel injector 200 may include a radially outer surface 230 and a radially inner surface 232 defined collectively by the end walls 202 and the side walls 204. The radially inner surface 232 may be a substantially flat and/or planar surface that is disposed radially inward from the fuel injection members 226, 228. In many embodiments, the fuel injector 200 may terminate at the radially inner surface 232. In various embodiments, the radially inner surface 232 of the fuel injector 200 may entirely in contact with the radially outer surface 312 of the flange portion 306 and sealingly coupled thereto, such that no air and/or fuel may escape the junction of the fuel injector 200 and the boss 300 during operation of the gas turbine 10. For example, as discussed herein, both the radially inner surface 232 of the fuel injector 200 and the radially outer surface 312 of the boss may both be substantially flat and/or planar surfaces that are sealingly coupled to one another via pressure form one or more mechanical fasteners 250.

In many embodiments, the second opening 310 of the boss 300 may include a first portion 314 that that converges in cross-sectional area from a radially outer surface 312 of the flange portion to a second portion 316 of the opening 310. The second portion 316 extends from the first portion 314 to the secondary combustion zone 60 and may define a uniform cross-sectional area, such that the second portion 316 of the opening 310 does not converge or diverge in the radial direction R.

As shown in FIG. 5, the fuel injection assembly 100 may include one or more alignment pins 150 that each extend into both a respective fastener hole 301 defined in the boss and an fastener hole 201 defined in the fuel injector 200. In many embodiments, each alignment pin 150 may extend within, and between, a respective end wall 202 and the flange portion 306 of the boss 300 The alignment pins 150 may function to ensure that the first opening 210 of the fuel injector 200 is properly aligned with the second opening 310 of the boss during assembly of the fuel injection assembly 100. Additionally, the alignment pins may function to maintain alignment of the first and the second openings 210, 310 during operation of the gas turbine 10.

Figure 6:
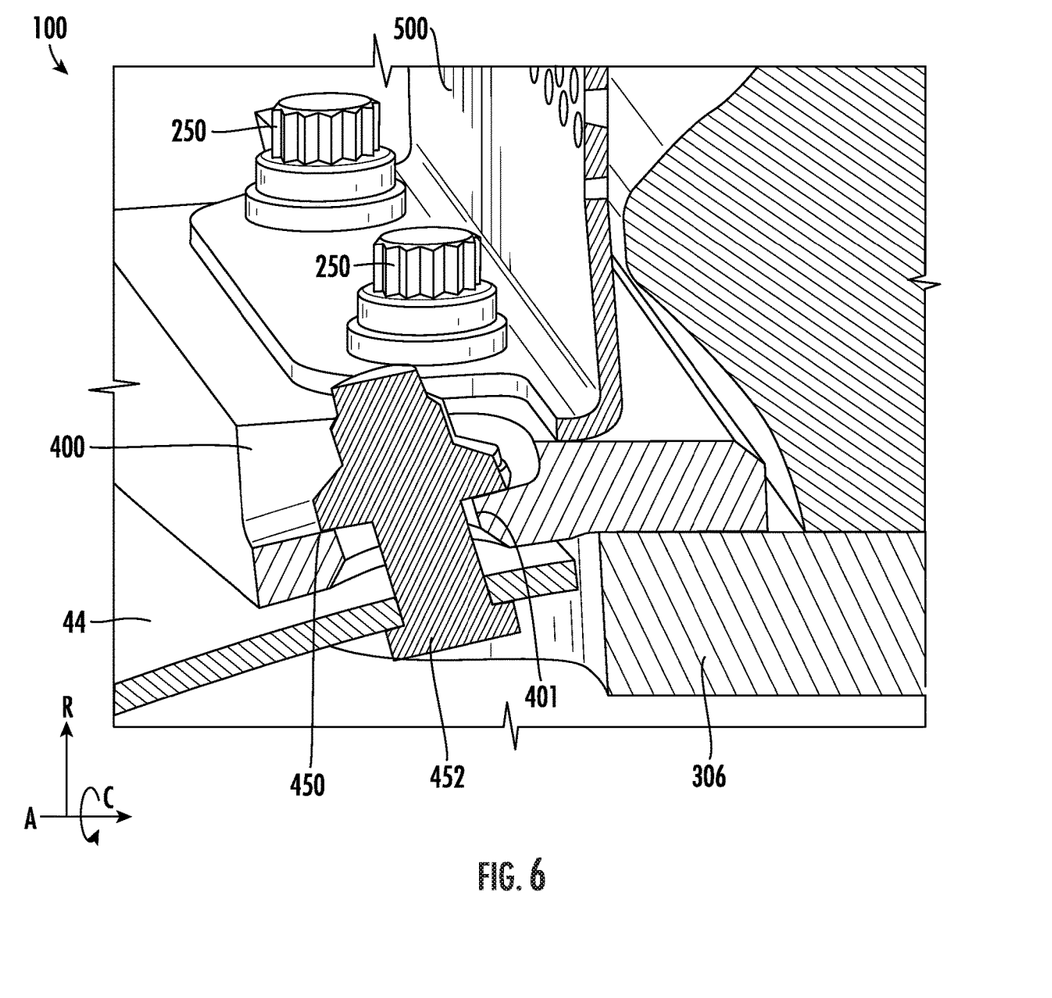
FIG. 6 illustrates an enlarged cross-sectional perspective view of a fuel injection assembly in accordance with embodiments of the present disclosure.

FIG. 6 illustrates an enlarged cross-sectional view of the fuel injection assembly 100, in accordance with embodiments of the present disclosure. As shown, the support plate 400 may couple the entire fuel injection assembly to the outer sleeve 44 of the combustor 17 via one or more mechanical fasteners 450. For example, in some embodiments, the mechanical fastener 450 include a flanged end 452 for retention of the of the outer sleeve 44.

Utilizing a fuel injection assembly 100 having separately formed components, instead of, e.g., a fuel injection assembly being entirely integrally formed as a single component, advantageously allows for increased manufacturing flexibility and decreased risk of having to scrap the entire fuel injection assembly when damaged, which results in cost savings. For example, as discussed herein, the boss 300 may be separately formed and made from a less expensive material than the fuel injector 200, such that any damage to the boss 300 caused from recirculation of combustion gases within the second opening would result in having to only replace the boss 300 and not the entire assembly 100. In this way, the overall life of the fuel injector 200 may be advantageously extended.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A combustor comprising:
    an axial direction, a radial direction, and a circumferential direction;
    an end cover;
    at least one fuel nozzle extending between the end cover and a combustion liner, wherein the combustion liner extends between the at least one fuel nozzle and an aft frame;
    an outer sleeve spaced apart from and surrounding the combustion liner such that a cooling flow annulus is defined therebetween, wherein the combustion liner defines a combustion chamber having a first combustion zone downstream from the at least one fuel nozzle and a second combustion zone downstream from the first combustion zone;
    a fuel injection assembly disposed downstream from the at least one fuel nozzle, the fuel injection assembly comprising:
        a fuel injector having end walls spaced apart from one another and side walls extending between the end walls, wherein the end walls and the side walls collectively define a first opening for passage of air, wherein at least one fuel injection member is disposed within the first opening and extends axially between the end walls, and wherein the fuel injector terminates in the radial direction at a radially inner surface;

a boss fixedly connected to the combustion liner such that the boss does not move with respect to the combustion liner, and the boss extending radially through the cooling flow annulus to a flange portion positioned at the outer sleeve, the boss defining a second opening that provides for fluid communication between the fuel injector and the second combustion zone, wherein the radially inner surface of the fuel injector is sealingly connected to the flange portion of the boss such that the first opening aligns with the second opening.

2. The combustor as in claim 1, wherein the fuel injector comprises a first material and the boss comprises a second material, and wherein the second material is different than the first material.

3. The combustor as in claim 1, wherein the side walls comprise a first side wall fuel injection member and a second side wall fuel injection member, and wherein the at least one fuel injection member comprises a first fuel injection member and a second fuel injection member.

4. The combustor as in claim 1, wherein the end walls and the side walls collectively define a cross-sectional area shaped as a geometric stadium, and wherein the cross-sectional area converges in a radially inward direction.

5. The combustor as in claim 1, wherein the second opening has a cross sectional area shaped as a geometric stadium.

6. The combustor as in claim 5, wherein the second opening comprises a first portion that that converges in cross-sectional area from a radially outer surface of the flange portion to a second portion, the second portion extends from the first portion to the second combustion zone and has a uniform cross-sectional area.

7. The combustor as in claim 1, wherein the flange portion of the boss includes a radially outer surface that is flat, and wherein the radially inner surface of the fuel injector is entirely in contact with the radially outer surface of the flange portion.

8. The combustor as in claim 1, wherein an alignment pin extends between each of the end walls and the flange portion of the boss to align the first opening of the fuel injector with the second opening of the boss.

9. The combustor as in claim 1, further comprising a support plate that couples the flange portion of the boss to the outer sleeve.

10. The combustor as in claim 9, further comprising an inlet flow conditioner coupled to one of the support plate or the flange portion, the inlet flow conditioner surrounding the fuel injector.

11. A turbomachine comprising:
a compressor section;
a turbine section; and
a combustor disposed downstream from the compressor section and upstream from the turbine section, the combustor comprising:
an axial direction, a radial direction, and a circumferential direction;
an end cover;
at least one fuel nozzle extending between the end cover and a combustion liner, wherein the combustion liner extends between the at least one fuel nozzle and an aft frame;
an outer sleeve spaced apart from and surrounding the combustion liner such that a cooling flow annulus is defined therebetween, wherein the combustion liner defines a combustion chamber having a first combustion zone downstream from the at least one fuel nozzle and a second combustion zone downstream from the first combustion zone;
a fuel injection assembly disposed downstream from the at least one fuel nozzle, the fuel injection assembly comprising:
a fuel injector having end walls spaced apart from one another and side walls extending between the end walls, wherein the end walls and the side walls collectively define a first opening for passage of air, wherein at least one fuel injection member is disposed within the first opening and extends axially between the end walls, and wherein the fuel injector terminates in the radial direction at a radially inner surface;
a boss fixedly connected to the combustion such that the boss does not move with respect to the combustion liner, liner and the boss extending radially through the cooling flow annulus to a flange portion positioned at the outer sleeve, the boss defining a second opening that provides for fluid communication between the fuel injector and the second combustion zone, wherein the radially inner surface of the fuel injector is sealingly connected to the flange portion of the boss such that the first opening aligns with the second opening.

12. The turbomachine as in claim 11, wherein the fuel injector comprises a first material and the boss comprises a second material, and wherein the second material is different than the first material.

13. The turbomachine as in claim 11, wherein the side walls comprise a first side wall fuel injection member and a second side wall fuel injection member, and wherein the at least one fuel injection member comprises a first fuel injection member and a second fuel injection member.

14. The turbomachine as in claim 11, wherein the end walls and the side walls collectively define a cross-sectional area shaped as a geometric stadium, wherein the cross-sectional area converges in a radially inward direction, and wherein the second opening has a cross sectional area shaped as a geometric stadium.

15. The turbomachine as in claim 14, wherein the second opening comprises a first portion that that converges in cross-sectional area from a radially outer surface of the flange portion to a second portion, the second portion extends from the first portion to the second combustion zone and has a uniform cross-sectional area.

16. The turbomachine as in claim 11, wherein the flange portion of the boss includes a radially outer surface that is flat, and wherein the radially inner surface of the fuel injector is entirely in contact with the radially outer surface of the flange portion.

17. The turbomachine as in claim 11, wherein an alignment pin extends between each of the end walls and the flange portion of the boss to align the first opening of the fuel injector with the second opening of the boss.

18. The turbomachine as in claim 11, further comprising a support plate that couples the flange portion of the boss to the outer sleeve.

19. The turbomachine as in claim 18, further comprising an inlet flow conditioner coupled to one of the support plate or the flange portion, the inlet flow conditioner surrounding the fuel injector.

* * * * *